(12) United States Patent  
Brand

(10) Patent No.: US 9,126,668 B2
(45) Date of Patent: Sep. 8, 2015

(54) SHAFT SEAL ARRANGEMENT FOR A SHIP BULKHEAD

(71) Applicant: Blohm + Voss Industries GmbH, Hamburg (DE)

(72) Inventor: Joerg Brand, Trittau (DE)

(73) Assignee: Blohm + Voss Industries GmbH, Hamburg (DE)

( * ) Notice: Subject to any disclaimer, the term of this patent is extended or adjusted under 35 U.S.C. 154(b) by 268 days.

(21) Appl. No.: 13/780,155

(22) Filed: Feb. 28, 2013

(65) Prior Publication Data

US 2013/0220196 A1 Aug. 29, 2013

(30) Foreign Application Priority Data

Feb. 29, 2012 (DE) .......................... 10 2012 004 443

(51) Int. Cl.
*B63H 23/32* (2006.01)
*F16J 15/16* (2006.01)

(52) U.S. Cl.
CPC ............... *B63H 23/321* (2013.01); *F16J 15/16* (2013.01); *B63H 2023/327* (2013.01)

(58) Field of Classification Search
USPC ......... 277/325, 331–333, 344, 503, 504, 505, 277/509, 543, 544, 545, 578, 579, 580, 581
See application file for complete search history.

(56) References Cited

U.S. PATENT DOCUMENTS

| 2,071,914 | A | * | 2/1937 | Bentley .......................... 277/544 |
| 2,642,942 | A | * | 6/1953 | Reynolds ........................ 166/57 |
| 3,948,531 | A | * | 4/1976 | Mitrani ......................... 277/543 |
| 4,114,058 | A | | 9/1978 | Albaric |
| 4,448,425 | A | | 5/1984 | von Bergen |
| 4,449,719 | A | * | 5/1984 | Radosay et al. ............... 277/543 |
| 4,770,387 | A | * | 9/1988 | Granger ......................... 251/1.3 |
| 4,927,112 | A | | 5/1990 | Wilson |
| 6,260,817 | B1 | * | 7/2001 | Lam et al. ...................... 251/1.3 |
| 7,815,193 | B2 | * | 10/2010 | Feistel et al. .................. 277/303 |

FOREIGN PATENT DOCUMENTS

| DE | 102008037746 | 2/2010 |
| EP | 0 079 480 | 5/1983 |
| GB | 2 140 880 | 12/1984 |

OTHER PUBLICATIONS

European Patent Office, European Search Report in counterpart EP Patent Application EP 13 00 0507, search completed on Jun. 18, 2013.

* cited by examiner

*Primary Examiner* — Vishal Patel
(74) *Attorney, Agent, or Firm* — W. F. Fasse

(57) ABSTRACT

A seal arrangement for sealing around a rotating shaft that passes through a ship bulkhead includes an expandible and contractible seal ring made of several seal ring segments, and radial actuators that engage the seal ring segments and can be power-activated, e.g. with a pressure medium, to pull the seal ring segments radially outwardly, thereby expanding the seal ring to a larger diameter spaced away from the shaft. When the radial actuators are not activated, the biasing force of springs contracts the seal ring segments to a smaller diameter, to establish sealing contact of the seal ring on the shaft. In normal operation a control unit activates the actuators, but if sensors detect a power failure or water in the ship, or a manual switching is triggered, then the seal arrangement contracts under spring force into the sealing condition with the seal rings sealing against the shaft.

18 Claims, 3 Drawing Sheets

SHAFT SEAL ARRANGEMENT FOR A SHIP BULKHEAD

PRIORITY CLAIM

This application is based on and claims the priority under 35 USC 119 of German Patent Application 10 2012 004 443.7, filed on Feb. 29, 2012, the entire disclosure of which is incorporated herein by reference.

FIELD OF THE INVENTION

The invention relates to a seal arrangement for sealing around a shaft that passes through an opening in a bulkhead of a ship. The invention further relates to a ship having such a shaft seal arrangement on a bulkhead thereof.

BACKGROUND INFORMATION

It is generally known to provide water-tight bulkheads that partition the interior space within the hull of a ship into separate water-tight compartments. Such water-tight bulkheads or partitions of the ship's interior volume provide increased safety in the event of a hull leak, hull breach, capsizing or other flooding event. Namely, if water is flooding into one of the partitioned compartments of the ship, it is intended to confine the water to the affected compartment, and prevent the flooding of water beyond the bulkheads into other water-tight compartments. For that purpose, any penetrations through the bulkheads, for example a through-hole through which a rotating shaft extends, must be sealed with a suitable seal arrangement, especially on the occurrence of a flooding event.

Thus, wherever a rotating shaft (such as a drive shaft extending from an engine to a propeller of the ship, or some other power train shaft) must penetrate through such a partition bulkhead, it is known to provide a seal around the shaft, which seal allows the shaft to rotate and also allows some radial motion or vibration of the shaft, while nonetheless establishing a water-tight seal around the shaft in the opening of the bulkhead through which the shaft extends. Various configurations of such shaft seals are known. In a simple seal arrangement, seal rings such as rubber or polymer seal rings are arranged around the shaft and contact the shaft to establish a seal, while allowing the shaft to rotate. However, such shaft seals all suffer certain disadvantages and problems. For example, the frictional rubbing contact of the shaft with the seal rings causes considerable wear of the seal rings, and also causes noise which is transmitted through the shaft seal into the bulkhead and the rest of the ship structure. The frictional rubbing contact also causes the generation of heat, which accelerates the wear and aging breakdown of the seal rings and/or the shaft. Even though some types of known shaft seals are adjustable, i.e. the position of the seal rings can be radially adjusted, it is nonetheless difficult to compensate or adapt to the arising radial shaft motion, and only a very limited range of radial motion can be accommodated. That causes further wear of the shaft seal.

It is desired to reduce the wear, reduce the noise generation, increase the operational longevity, reduce the maintenance, avoid the further disadvantages of known shaft seals, and still provide effective sealing when the need for providing a water-tight seal of the bulkhead arises.

SUMMARY OF THE INVENTION

In view of the above, it is an object of the invention to provide a shaft seal arrangement of the type generally discussed above, for sealing around a rotatable shaft where the shaft penetrates through a ship's bulkhead, whereby the shaft seal shall provide effective sealing upon the occurrence of a flooding event, yet avoid the disadvantages of the prior art such as the generation of noise and heat as well as rapid wear of the shaft seal during normal operation of the ship. More particularly, it is an object of the invention to provide a shaft seal arrangement that produces a water-tight seal especially only in the event of detection of water within the ship or loss of power in the ship or a manual triggering, while the seal function is preferably released or disengaged during normal operation. In this manner, the invention aims to achieve significantly reduced wear, greatly increased maintenance intervals, and better seal functionality when the seal function is actually needed, i.e. when water has penetrated into the ship or some other fault exists. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a shaft seal arrangement for a bulkhead of a ship or the like, or any other "bulkhead", i.e. any other wall with an opening through which a shaft extends, where a water-tight seal is to be provided around the shaft. According to the invention, the seal arrangement comprising a seal ring, a housing, plural power-activatable radial actuators, and at least one spring. The seal ring comprises plural seal ring segments, and has an inner diameter which can be adjusted by moving the seal ring segments radially outwardly and radially inwardly relative to an axis of the seal ring, The housing supports the seal ring and is adapted to be mounted on the bulkhead around the opening of the bulkhead. The power-activatable radial actuators are carried by the housing circumferentially distributed about the axis, and are coupled to the seal ring segments. The at least one spring is coupled to and applies a radially inward spring-bias to the seal ring segments and/or the radial actuators. In an installed condition, the seal ring encircles the shaft, the radial inward spring-bias of the at least one spring urges the seal ring segments radially inwardly into sealing contact on the shaft whereby the inner diameter of the seal ring matches an outer diameter of the shaft, and the radial actuators when activated are operative to pull the seal ring segments radially outwardly away from the shaft against the radial-inward spring bias so that the inner diameter of the seal ring becomes larger than the outer diameter of the shaft.

In preferred detailed embodiments of the invention, the shaft seal arrangement further comprises a segmented pressure ring that is arranged circumferentially around the seal ring, and that has a spring ring or annular or circumferential spring arranged around the pressure ring, to spring-bias and urge the several segments of the seal ring radially inwardly into contact against the outer circumferential surface of the shaft. The arrangement preferably further includes a control unit that actuates the adjusting devices or actuators during normal operation, so as to pull the seal ring segments radially outwardly away from the rotating shaft, and thereby establish an open annular gap between the shaft and the expanded seal ring. Thus there is no wear, no heat generation, and no noise generation during normal operation. When a water sensor connected to the control unit senses that water has entered a critical area of the ship, or if electrical power is lost, or if a manual switch is triggered, then the control unit de-activates the adjusting devices or actuators, and then the annular spring ring and/or other springs are effective to move the seal ring segments radially inwardly, whereby the seal ring is effectively reduced in diameter and brought into sealing contact on the outer circumferential surface of the shaft.

Generally, the radial actuators can be any power-activated devices, i.e. any devices activated by electrical, pneumatic or hydraulic power applied thereto, that are effective to pull the seal ring segments radially outwardly away from the shaft against the spring bias applied by the at least one spring. For example, the radial actuators may comprise solenoids or other electromagnetically driven linear actuators, or radially extending acme shafts or screw shafts driven by servomotors, stepper motors or other electric motors, or radially extending piston-cylinder devices. Preferably, the adjusting devices or actuators respectively comprise piston-cylinder devices, and especially preferably pneumatic piston-cylinder devices that are activated by pressurized air that is supplied and vented through suitable valves controlled by the control unit. Active supply of pressurized air into the actuator cylinders expands the shaft seal ring by pulling the shaft seal ring segments radially outwardly. If the supply of pressurized air is discontinued and instead vented from the actuator cylinders, then the mechanical spring force causes the seal ring to close radially inwardly around the shaft. Thus, this ensures fail-safe operation so that the seal will be closed in a water-tight manner around the shaft if there is a loss of pressurized air or electrical power to the shaft seal system. Also, whenever water is detected, the shaft seal arrangement will be closed in a water-tight manner. On the other hand, during normal operation, the seal ring is pulled or expanded radially outwardly away from the shaft, so as to avoid seal wear during normal operation.

In a particular embodiment, the seal arrangement includes two axially adjacent seal rings that are each made up of several, e.g. six, seal ring segments that overlap one another at neighboring ends in a circumferential direction with a lap joint or mortise and tenon arrangement. There may be more or fewer than six segments, but six segments are preferred as the best balance between simplicity of construction, good adjustability over a useful diameter range of the "open" and "closed" seal, and good water-tightness. Also, there may be more or fewer than two of the axially adjacent seal rings, to provide an additional layer or level of seal, but two seal rings are preferred as the best balance between simplicity of construction and good water-tightness. It should be understood that the "water-tight" sealed condition does not need to completely prevent the penetration of any water. Instead, a small amount or rate of leakage is generally permissible, for example as set forth in the applicable specifications for the installation of the seal arrangement.

In a particular preferred embodiment, each adjusting device or radial actuator comprises a piston rod that extends radially outwardly axially between the two seal rings. A radially inner free end of the piston rod has a carrier element or engaging element that engages into corresponding receiving recesses of the segments of the seal rings, so as to be able to radially outwardly lift or pull the seal ring segments radially outwardly away from the shaft. At a location radially outwardly from the seal rings, the opposite end of the piston rod is connected to a movable piston within a piston chamber or cylinder that can be pressurized with a controllably supplied pressure medium such as compressed air through a supply port. A compression spring is arranged radially outwardly from the piston, so as to urge the piston in a radially inward direction. When compressed air is supplied to the piston chamber, it drives the piston radially outwardly against the force of the compression spring. When the supply of compressed air is discontinued and especially vented, the compression spring drives the piston radially inwardly toward the shaft, and this motion along with the radial inward bias applied by the spring ring moves the seal ring segments radially inwardly toward and into contact with the shaft. This establishes the water-tight seal around the shaft.

With the above active seal arrangement according to the invention, a water-tight seal around the shaft is ensured whenever water is detected in the ship or whenever there is a loss of electrical power or compressed air supply. On the other hand, during normal operation, the seal ring is retracted radially outwardly away from the shaft to allow a free annular gap around the shaft, i.e. between the shaft and the seal. Thereby, in normal operation there is no friction between the shaft and the seal ring, so that there is no wear, no noise generation, no transmission of noise or vibrations from the shaft into the ship bulkhead, no problem of accommodating or adapting to radial movements of the shaft, and also no limit on the rotational speed of the shaft.

Additional embodiment features of the invention will be apparent from the further detailed description.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND BEST MODE OF THE INVENTION

Figure 1:
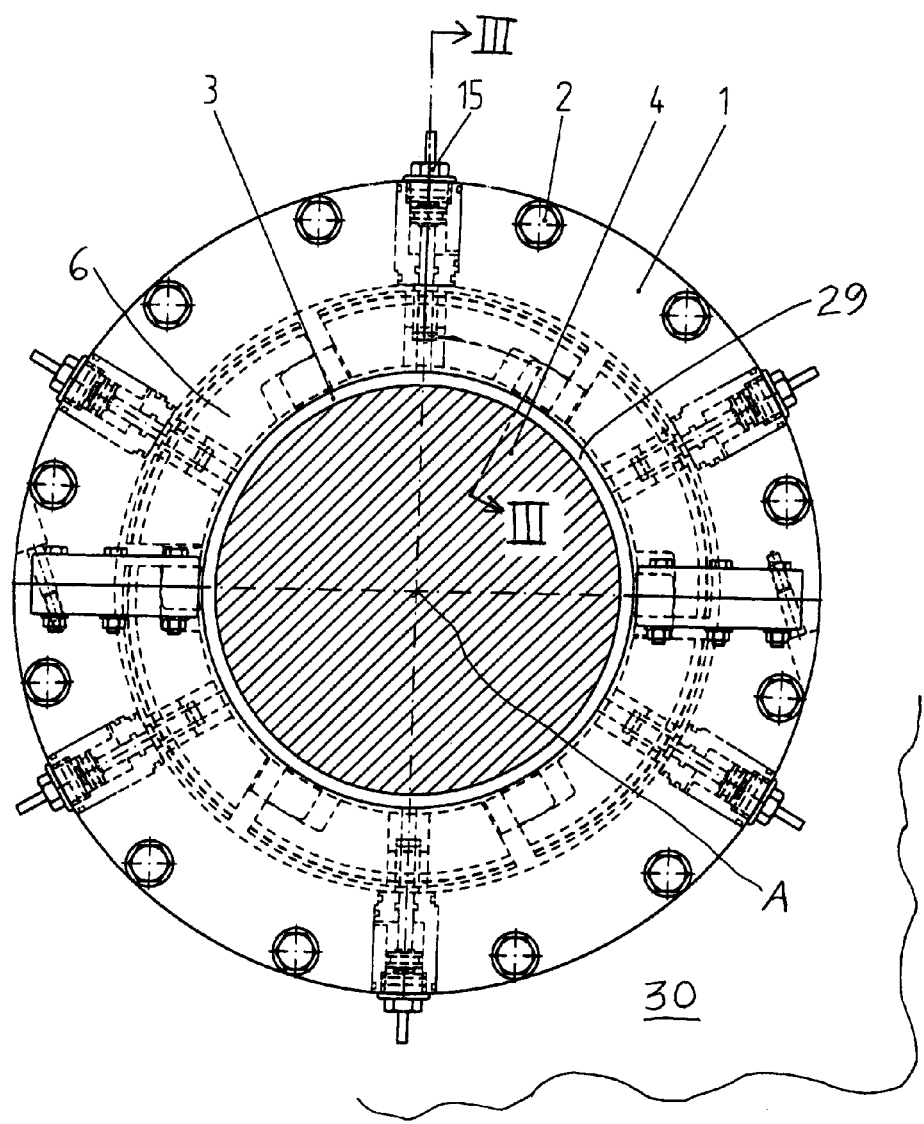
FIG. 1 schematically shows a plan view of a shaft seal arrangement according to the invention, with internal components shown as a "ghost" view in dashed lines, including a shaft seal ring and actuators received in a housing mounted on a ship bulkhead, and a cross-section of a shaft passing through the central opening of the arrangement, which is shown in an activated unsealed condition.

FIG. 1 schematically shows a cross-section through a shaft 4 that passes through an opening in a schematically indicated bulkhead 30 of a ship. The axis A forms the basis for all reference to radial, axial and circumferential directions throughout this specification. The axis of the shaft 4 nominally coincides with the axis A of the seal arrangement, but in operation the shaft may deviate slightly from coaxial alignment. The shaft seal arrangement according to the invention is arranged around the shaft 4, and comprises a two-part housing 1 that is connected to the ship bulkhead 30 by bolts or screws 2. The housing 1 has a through hole 3 with a diameter larger than the outer diameter of the shaft 4 so as to form a radial spacing and thus an annular clearance gap 29 between the shaft seal arrangement and the shaft 4. The housing 1 is assembled (e.g. bolted together) from two half-housings, so that the shaft seal arrangement can be mounted or even retrofitted around a shaft 4 that is already in place penetrating through an opening in the ship bulkhead 30.

Figure 2:
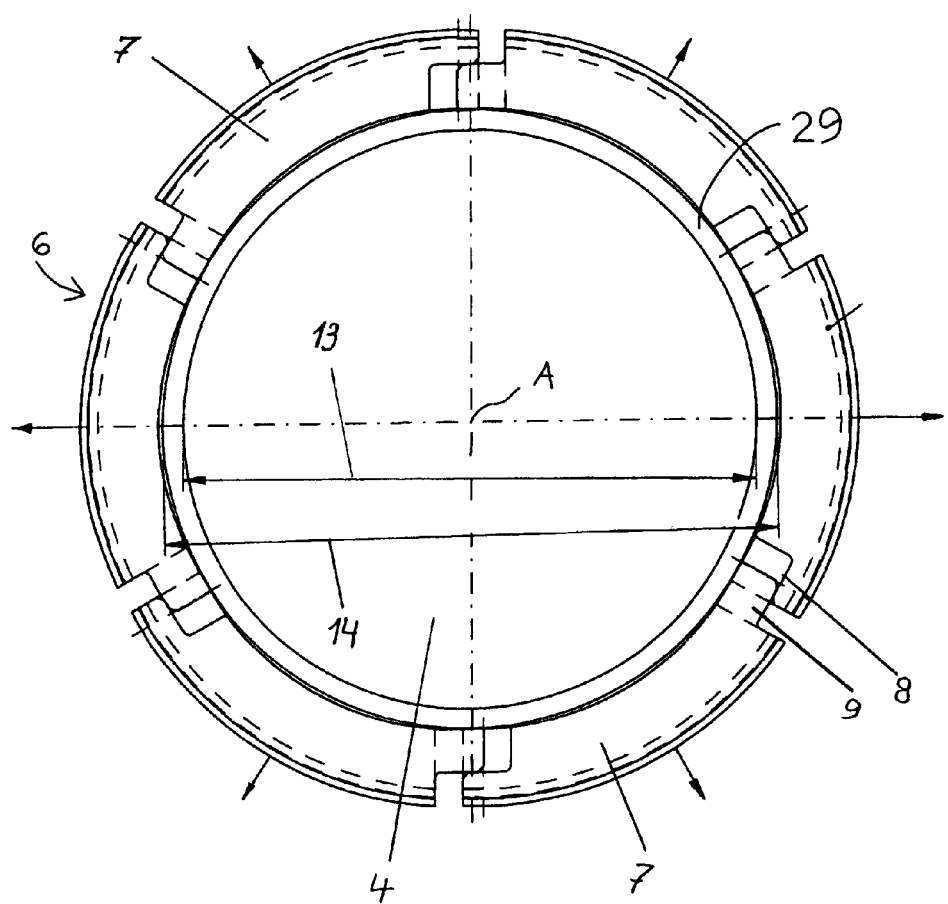
FIG. 2 is an axially directed plan view of the adjustable seal rings made up of several circumferentially overlapping seal ring segments, as used in the shaft seal arrangement of FIG. 1.
Figure 3:
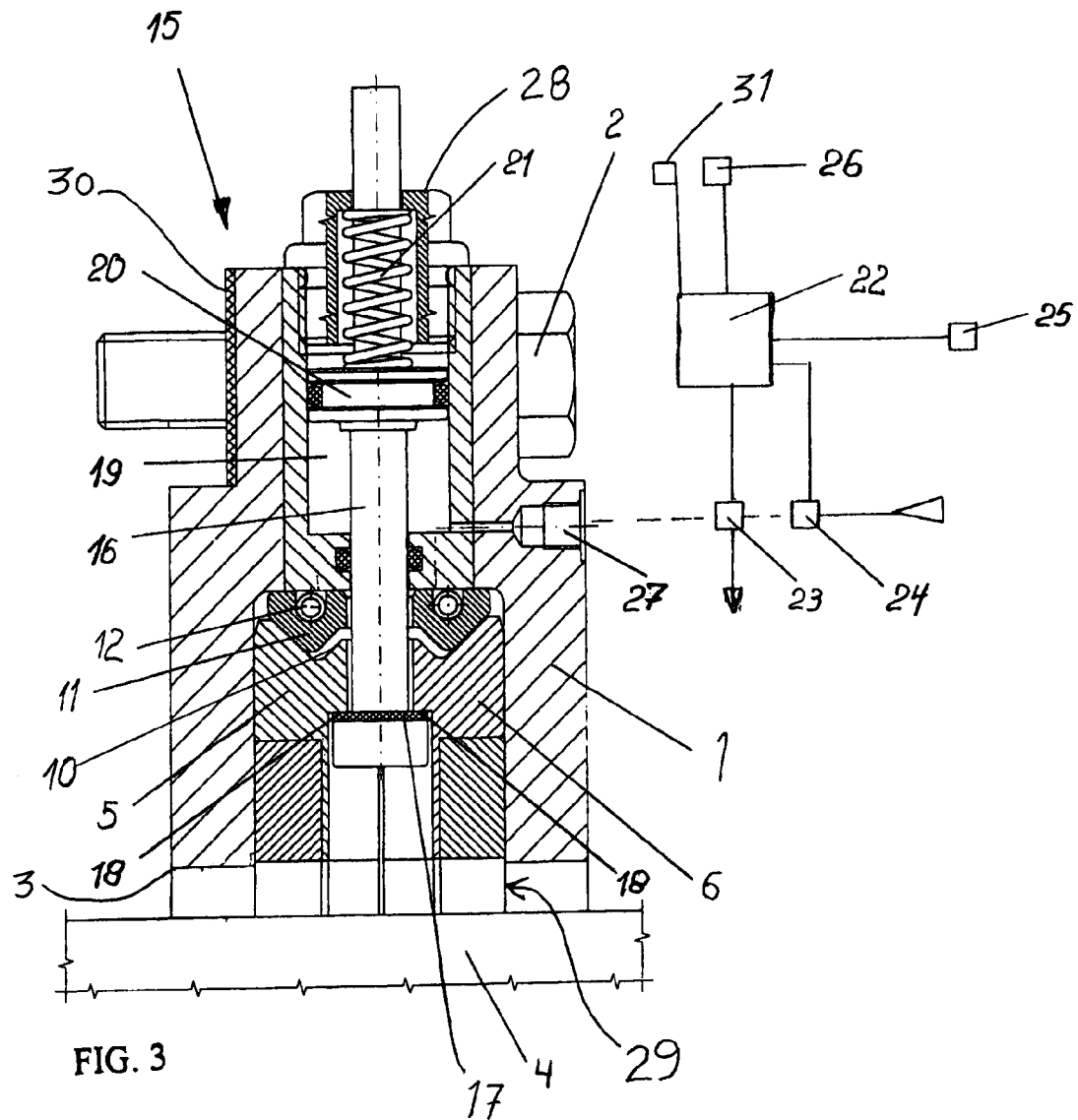
FIG. 3 is a sectional view taken along the section line III-III in FIG. 1, showing a portion of the shaft seal arrangement, especially one of the radial actuators and its cooperation with the seal rings, along with a schematically indicated control arrangement.

As can be seen especially in the sectional view of FIG. 3, the seal arrangement further includes two seal rings 5 and 6 that are arranged parallel to one another and axially spaced from one another around the shaft 4. As can be seen in FIGS. 1 and 2, each one of the seal rings 5 and 6 comprises a plurality, e.g. preferably six, seal ring segments 7 that adjoin and overlap one another in the circumferential direction. Thereby, the diameter of the seal ring 5 or 6 can be adjusted by moving the several seal ring segments 7 radially outwardly (as indicated by arrows in FIG. 2) or radially inwardly, and thereby adjusting the degree of circumferential overlap of the neighboring segments 7. Particularly, in the illustrated embodiment, the circumferentially adjoining ends of seal ring segments 7 are configured with an undercut recess 8 and a protruding guide element 9 such as a projection or tenon that is slidingly received in the recess 8. In this embodiment, the overlap is along a circumferential cylindrical surface, but alternatively the overlap may be along a radial plane extending normal to the axis A at a location half-way through the axial thickness of the seal ring segments. In these manners, the diameter 14 of the seal ring 5 or 6 is adjustable, at least ranging from the diameter 13 of the shaft 4 to the diameter of the through hole 3 of the housing 1.

During normal operation of the ship, when no seal function is required because there is no water present in the respective compartment or compartments on opposite sides of the bulkhead of the ship, and there is normal operating power, then the seal ring 5 or 6 will be expanded to its maximum diameter 14, so that the seal rings 5 and 6 are retracted radially outwardly away from the outer circumferential surface of the shaft 4, thereby creating a clear annular spacing gap 29 between the shaft 4 and the seal arrangement. On the other hand, when water is detected at a critical location in the ship, or there is a power failure, or there is a manual triggering, then the seal rings 5 and 6 will be contracted to a smaller diameter by moving the seal ring segments 7 radially inwardly toward and into contact with the shaft 4, while increasing the overlap of the projecting guide elements 9 into the recesses 8 of the neighboring segments 7. Thereby the seal rings 5 and 6 are brought into sealing contact with the shaft 4. The sealing position of the seal rings 5 and 6 is not shown in the drawings.

The seal ring segments 7 are made of any suitable seal material such as rubber or a synthetic polymer or a composite that achieves a water-tight seal against the circumferential surface of the shaft 4 while allowing the shaft 4 to rotate with a low coefficient of friction between the seal rings and the shaft. The housing is made of metal, polymer or composite. The sectional hatching lines in the drawings do not identify the type of material of the various components according to drawing conventions.

The outer circumferential area of each one of the seal rings 5 and 6 has therein a guide groove 10 configured to receive therein a similarly segmented pressure ring 11, respectively. The segments of the pressure ring 11 may be made of metal, polymer or composite. Each pressure ring 11 receives in a circumferential groove thereof an annular or circumferential spring or spring ring 12, for example configured as a ring-shaped tension spring. The annular spring 12 biases and urges the respective pressure ring 11 radially inwardly, so that the pressure ring 11 bears radially inwardly on the respective seal ring 5 or 6 via the corresponding guide groove 10 thereof. Thus, the two annular springs 12 ultimately serve to urge the seal rings 5 and 6 radially inwardly into sealing contact on the outer surface of the shaft 4. Thereby the springs 12 are coupled to the seal rings 5 and 6 through the intermediate pressure rings 11. In general, the term "coupled" means operatively connected, whereby the connection may be direct with no other interposed components, or may be indirect through one or more interposed further components. The guide grooves 10 and the mating guide ridges of the pressure rings 11 have cooperating sloped or angled guide surfaces, which cause an axially directed force between the pressure rings 11 and the seal rings 5 and 6 whenever there is a radial relative motion therebetween.

As can be seen in FIGS. 1 and 3, the seal arrangement further includes several, e.g. preferably six, adjusting devices or radial actuators 15. Preferably, one respective radial actuator 15 is allocated to each respective segment 7 of the seal rings 5 and 6. Each radial actuator 15 extends along and provides actuating travel along a line extending radially from the axis A of the shaft 4. Particularly, the radial actuators 15 can be activated to pull the seal ring segments 7 radially outwardly so as to expand the diameter 14 of the seal rings 5 and 6 away from and larger than the diameter 13 of the shaft 4, against the contracting force exerted by the annular springs 12.

In the illustrated embodiment, each radial actuator or adjusting device 15 comprises a piston rod 16 that extends radially outwardly between the two seal rings 5 and 6. A carrier element or engaging element 17 provided or secured at the radially inner end of the piston rod 16 engages in respective allocated receiving recesses or openings 18 of the seal ring segments 7 of the respective associated seal rings 5 and 6, so that thereby the piston rod 16 can pull the segments 7 of the seal rings 5 and 6 radially outwardly. The radially outer end of the piston rod 16, radially outwardly from the seal rings 5 and 6, is provided with or attached to a piston 20 that is movably arranged within a piston chamber or cylinder 19. Radially outwardly from the piston 20, a compression spring 21 is received between the piston 20 and a counter support 28 connected to the housing 1. Thus, the compression spring 21 exerts a radially inwardly directed biasing force onto the piston 20. The piston rod 16, or a smaller-diameter guide rod, may continue radially outwardly through the axial center of the spring 21 to provide support and guidance for the spring 21 and the piston 20.

When a pressurized pressure medium is supplied into the piston chamber 19, the piston 20 is thereby driven radially outwardly against the force of the spring 21, and pulls the piston rod 16 radially outwardly. Thereby, the carrier or engaging element 17 at the opposite end of the piston rod 16 engages the segments 7 of the seal rings 5 and 6, and thereby pulls the seal ring segments radially outwardly, which expands the diameter 14 of the seal rings 5 and 6 outwardly away from the diameter 13 of the shaft 4. Thus, the shaft 4 is not sealed at this time, because there is a clear spacing gap 29 between the shaft 4 and the seal rings 5 and 6. Accordingly, in this unsealed normal operating condition as shown in the drawings, there is no heat generation, no noise generation, and no wear of the shaft 4 or the seal rings 5 and 6.

On the other hand, if pressurized pressure medium is no longer supplied to the piston chamber 19, and especially if the piston chamber 19 is vented, then the spring force of the compression spring 21 drives the piston 20 radially inwardly, which in turn drives the piston rod 16 radially inwardly, whereby the seal ring segments 7 of the seal rings 5 and 6 move radially inwardly, under the biasing force of the annular springs 21 and/or the compression springs 21, until the seal rings 5 and 6 come into sealing contact with the shaft 4. Thus, the springs 21 may be coupled to and act on the seal rings 5 and 6 through the pistons, piston rods, and engaging elements if the engaging elements also provide a connection to pull the seal rings radially inwardly. This sealing condition is to be achieved whenever the sealing function is necessary, for example when water has been detected in the ship, or there is a power failure, or the sealing function has been manually triggered. The seal arrangement preferably includes two types of springs, namely the circumferential springs 12 and the radial compression springs 21. Nonetheless, a functional arrangement can also be constructed with only one of these types of springs, by suitable dimensioning of the spring force etc.

In the illustrated embodiment, the pressure medium is preferably compressed air that is supplied through a connection port 27 feeding into the piston chamber 19. As schematically indicated in FIG. 3, the compressed air is supplied through a control and valve arrangement. Particularly, a control unit 22 controls a vent valve 23 and a pressure supply valve 24. A source of pressurized air is connected to the supply valve 24, and the vent valve selectively vents to the ambient surrounding atmosphere. The system further includes a water sensor 25, which provides a corresponding signal to the control unit 22 in the event the sensor 25 detects water in a critical location in the ship. Still further, a power monitor 26 is connected to the control unit 22 and provides a corresponding signal if a fault or loss of electrical power is detected. In response to such a sensor signal, e.g. in the event of water detection or power failure detection, the control unit 22 closes the pressure supply valve 24 and opens the vent valve 23, whereby the supply of pressurized air is discontinued and instead the pressure in the piston chamber 19 is vented through the valve 23 to the ambient atmosphere. Thus, thereby the seal arrangement will automatically contract into the sealing condition as described above, under the biasing force of the springs 21 and 12.

Furthermore, a manual actuation switch 31 may be connected to the control unit 22, so that the release of the seal arrangement into the sealing condition can also be manually triggered. As a further option, the valves 23 and 24 may be manually operated to discontinue the supply of pressure medium and instead vent the piston chambers 19, to thereby release the seal arrangement into the sealing condition. As a further alternative, the valves 23 and 24 can be electrically or electromagnetically actuated valves that automatically shut off the supply of pressure medium and instead vent the piston chamber in the event of an electric power failure. Also, in the event of a loss or failure of the supply of pressurized actuating medium, the seal arrangement will automatically retract into the sealing condition under the biasing force of the springs 12 and 21, as described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A seal arrangement for providing a seal around a shaft extending through an opening in a bulkhead, comprising:
    a seal ring that comprises plural seal ring segments and has an inner diameter which can be adjusted by moving said seal ring segments radially outwardly and radially inwardly relative to an axis of said seal arrangement;
    a housing that supports said seal ring and is adapted to be mounted on the bulkhead around the opening of the bulkhead;
    plural power-activatable radial actuators that are carried by said housing circumferentially distributed about said axis, and are coupled to said seal ring segments;
    at least one spring that is coupled to and applies a radially inward spring-bias to said seal ring segments or to said radial actuators, wherein said at least one spring includes a first spring; and
    a pressure ring arranged between said seal ring and said first spring, wherein said pressure ring has a radially inwardly protruding guide ridge, said seal ring has a radially outwardly facing guide groove that receives said guide ridge therein, and said guide ridge and said guide groove have mutually cooperating guide surfaces that slope conically about said axis and cause an axially directed guide force due to radially directed relative motion of said guide ridge in said guide groove;
    wherein, in an installed condition, said seal ring encircles the shaft, said radial inward spring-bias of said at least one spring urges said seal ring segments radially inwardly into sealing contact on the shaft whereby said inner diameter of said seal ring matches an outer diameter of the shaft, and said radial actuators when activated are operative to pull said seal ring segments radially outwardly away from the shaft against said radial-inward spring bias so that said inner diameter of said seal ring becomes larger than the outer diameter of the shaft.

2. The seal arrangement according to claim 1, wherein there is an open annular gap around the shaft, between the shaft and said seal ring, when said radial actuators are activated.

3. The seal arrangement according to claim 1, wherein said first spring comprises a circumferential spring that is arranged outwardly circumferentially around said seal ring and applies said radially inward spring-bias to said seal ring segments.

4. The seal arrangement according to claim 3, wherein said pressure ring has an expandible and contractible diameter and is arranged outwardly circumferentially around said seal ring, between said seal ring and said circumferential spring, with said circumferential spring bearing circumferentially and radially inwardly on said pressure ring which bears radially inwardly on said seal ring, whereby said circumferential spring applies said radially inward spring-bias to said seal ring segments through said pressure ring.

5. The seal arrangement according to claim 4, wherein said pressure ring comprises plural pressure ring segments respectively allocated to and arranged on said seal ring segments.

6. The seal arrangement according to claim 3, wherein said at least one spring further includes, for each respective one of said radial actuators, a respective compression spring that bears radially inwardly on said respective radial actuator and applies said radially inward spring-bias to said respective radial actuator.

7. The seal arrangement according to claim 1, wherein each one of said seal ring segments has a circumferentially protruding guide projection and a recess, and respective adjacent ones of said seal ring segments overlap one another circumferentially with said guide projection of a respective one of said seal ring segments received in said recess of a circumferentially adjacent one of said seal ring segments, whereby an extent of said overlap varies as said inner diameter of said seal ring is adjusted.

8. The seal arrangement according to claim 1, wherein said seal ring includes exactly six of said seal ring segments which each account for 60° of a complete circumference of said seal ring.

9. The seal arrangement according to claim 1, wherein said seal ring is a first seal ring, said seal arrangement further comprises a second seal ring arranged axially adjacent and parallel to and coaxially aligned with said first seal ring, and said second seal ring comprises plural second seal ring segments and has an adjustable second seal ring inner diameter.

10. The seal arrangement according to claim 1, wherein each one of said radial actuators respectively comprises a piston chamber arranged radially outwardly from said seal ring, a piston arranged movably in said piston chamber, a piston rod coupled to said piston and to said seal ring, and a pressure medium port communicating into said piston chamber and adapted to be connected to a supply of a pressurized pressure medium, whereby supplying the pressure medium into said piston chamber drives said piston radially outwardly, which moves said piston rod radially outwardly, which pulls at least one of said seal ring segments radially outwardly, against said radially inward spring-bias exerted by said at least one spring.

11. The seal arrangement according to claim 10, wherein said at least one spring further includes a respective compression spring arranged radially outwardly from and bearing radially inwardly against said piston respectively in each one of said radial actuators.

12. The seal arrangement according to claim 10, wherein each one of said radial actuators respectively further comprises an engaging element that is connected to a radially inner end of said piston rod and that is engaged in a receiving recess provided in a respective one of said seal ring segments whereby said piston rod is coupled to said respective seal ring segment for pulling said respective seal ring segment radially outwardly.

13. The seal arrangement according to claim 10, further comprising a pressure medium supply valve and a vent valve connected to said pressure medium port of said piston chamber, and a control unit connected to said valves and adapted to control said valves.

14. The seal arrangement according to claim 13, further comprising a water sensor and a power failure sensor that are connected for signal transmission to said control unit, wherein said control unit is adapted to close said vent valve and to open said pressure medium supply valve to supply the pressure medium into said piston chamber during a normal operating condition, and wherein said control unit is adapted to open said vent valve and to close said pressure medium supply valve to vent said piston chamber in an emergency sealing condition when said water sensor signals to said control unit that water has been detected or said power failure sensor signals to said control unit that a power failure has been detected.

15. The seal arrangement according to claim 14, further comprising a manual operation switch connected to said control unit or to at least one of said valves.

16. The seal arrangement according to claim 10, further comprising a compressed air supply that is adapted to supply compressed air as said pressure medium, and that is connected to said pressure medium port.

17. The seal arrangement according to claim 1, wherein the number of said radial actuators equals the number of said seal ring segments, and a respective one of said radial actuators is coupled to each respective one of said seal ring segments.

18. A ship comprising:
said seal arrangement according to claim 1;
a bulkhead with an opening; and
a rotatable shaft extending through said opening in said bulkhead;
wherein said seal arrangement is arranged around said shaft and mounted on said bulkhead covering said opening.

* * * * *